United States Patent

Donlon

[15] 3,653,485
[45] Apr. 4, 1972

[54] AN AIR BEARING CONVEYOR
[72] Inventor: Richard H. Donlon, Troy, Mich.
[73] Assignee: Transportation Technology, Inc., Madison Heights, Mich.
[22] Filed: Mar. 5, 1971
[21] Appl. No.: 121,605

Related U.S. Application Data

[63] Continuation-in-part of Ser. No. 778,546, Nov. 25, 1968, abandoned.

[52] U.S. Cl. ................................. 198/25, 198/38, 214/16 B, 198/184
[51] Int. Cl. ............................................................ B65g 1/04
[58] Field of Search ................. 214/11 R, 16 B; 198/31, 184, 198/25; 180/124; 193/36

[56] References Cited

UNITED STATES PATENTS

| | | | |
|---|---|---|---|
| 2,932,380 | 4/1960 | Alvey et al. | 198/162 |
| 2,975,701 | 3/1961 | Munschauer et al. | 100/214 |
| 3,045,802 | 7/1962 | Miller | 214/6 P X |
| 3,052,339 | 9/1962 | Carter | 214/1 AB X |
| 3,056,514 | 10/1962 | Williamson | 214/6 P |
| 3,273,727 | 9/1966 | Rogers et al. | 214/16 B |
| 3,313,367 | 4/1967 | Swedburg | 180/124 X |
| 3,414,076 | 12/1968 | Bertin et al. | 180/124 |
| 3,469,887 | 9/1969 | Nakahara et al. | 214/1 AB X |
| 3,273,727 | 9/1966 | Rogers et al. | 214/1 BE |

*Primary Examiner*—Gerald M. Forlenza
*Assistant Examiner*—R. B. Johnson
*Attorney*—McGlynn, Reising, Milton & Ethington, Adelman, Krass, Perry, Young & Thorpe

[57] ABSTRACT

Article handling apparatus including load supporting means in the form of air bearings mounted on decks and actuable to provide a film of air for supporting a load above the surface of the decks. Propulsion means, which may be in the form of conveyor belts, are associated with one or more of the decks and have extended and retracted positions respectively engageable with, and spaced from, a load supported above the surface of the decks on the film of air. The propulsion means may be actuable to an extended position in response to energization of the air bearings so that the path of movement of the load can be determined by energization of a particular group of air bearings, and the direction of movement along the path can then be determined by energization of the propulsion means.

7 Claims, 5 Drawing Figures

Patented April 4, 1972

INVENTOR.
Richard H. Donlon
BY
Barnard, McGlynn & Reising
ATTORNEYS

Patented April 4, 1972

INVENTOR.
Richard H. Donlon
BY
Barnard, McGlynn & Reising
ATTORNEYS

AN AIR BEARING CONVEYOR

This application is a continuation of Ser. No. 778,546 filed Nov. 25, 1968 and now abandoned.

This invention relates generally to article handling apparatus and systems and is particularly concerned with an article handling apparatus and system for handling freight containers, vehicles and other articles capable of being supported for substantially friction-free movement on a film of air provided by air bearings or the like.

With the increase in the volume of freight, severe demands are being placed on existing handling and warehousing facilities. In the field of air freight, for example, extraordinary demands are being placed on ground equipment and facilities for the transfer and warehousing of air freight containers or articles, and existing systems will soon not have the ability to maintain a continuous and orderly flow of goods. There is, therefore a definite need, at air freight terminals particularly, for a handling and storage system for freight containers. After unloading from aircraft or ground vehicles, freight containers or pallets are placed in a warehouse where they are either held in storage at selected locations within the warehouse, or are trans-shipped to other aircraft or ground handling vehicles. The type of equipment currently used for this process consists generally of inverted casters mounted in structures laid on the warehouse floor.

Freight handling systems for warehouses at different locations must be capable of meeting the specific demands at the different locations and capable of operating under different conditions. For example, one warehouse may require a particular traffic pattern and may be of a particular size, while a warehouse at another terminal may have smaller floor space requiring a different traffic pattern and must be capable of meeting different demands. Thus, it is desirable to provide a modular structure for a freight handling system that can be combined in various arrangements and provide the flexibility necessary to meet the varying demands.

In recent years, air bearings have been developed for maintaining a film of air between a floor or deck and an article such as a pallet in order to enable omni-directional, friction-free movement of the article over the deck.

It is therefore an object of this invention to provide an article handling system wherein the articles are supported for substantially friction-free horizontal movement when propelled by propulsion devices, such as conveyor belts, normally spaced from the supported articles, but which are extendable to engage and propel the article by energization of air bearings associated with the propulsion devices.

A further object is to provide an article handling system including a plurality of air bearings for supporting articles above the surface of a deck, and propulsion means having extended and retracted positions respectively engageable with, and spaced from, articles supported above the surface of the deck by the air bearings for selectively propelling loads over the surface of the deck.

Still another object is to provide article handling apparatus including a plurality of decks with load supporting means associated with each of the decks energizable to provide a film of air for supporting a load above the surface of the associated deck; and propulsion means associated with at least one of the decks having extended and retracted positions respectively engageable with and spaced from articles supported above the surface of the decks on the film of air in which the response to energization of the load supporting means for the deck portion associated with the propulsion means.

Still another object is to provide an article handling module having a plurality of propulsion devices selectively operable to propel a load along its respective path when a plurality of air bearings on either side of the propulsion devices for supporting the load above the surface of the deck are energized.

Still another object is to provide an article handling module having a center deck, means defining a plurality of paths of movement each extending outwardly from the center deck at an angle with respect to the adjacent path of movement, a main deck located between each adjacent pair of the paths and extending from the center portion to the periphery of the module, a group of air bearings on each of the main deck portions for supporting a load above the surface thereof, and a propulsion device on each of the paths selectively operable to propel a load along its respective path.

A further object is to provide an article handling system for storing, collecting and transporting articles such as palletized freight containers wherein the articles can be moved to selected storage areas along any one or more of a plurality of paths while supported friction-free on a film of air.

Another object is to provide an article handling system having a storage, collection and transporting area for articles such as freight containers, pallets and the like having a primary path of movement for the articles defined in said area and extending in one direction across the area and a plurality of secondary paths extending in different directions and connecting the first path with storage or unloading areas spaced from the primary path, with air bearings or the like on each side of each path for providing a film of air to support the articles, and a plurality of propulsion devices along each path individually actuable to propel an article straddling the respective path and supported on the film of air above the decks adjacent thereto a selected distance.

In carrying out the foregoing, and other objects, an article handling module according to the present invention may include a center deck with a plurality of paths of movement defined that extend outwardly from the center deck. A main deck is located between each adjacent pair of the paths and extends from the center deck to the periphery of the module. A group of air bearings is located on each main deck for supporting an article above the surface thereof, and a propulsion device is located on each path and is selectively operable to propel a load therealong. The propulsion device may be in the form of a conveyor movable between an extended and retracted position so as to selectively engage and propel articles supported on the air bearings. The conveyor belts have a portion overlying belt supporting air bearings, which, when energized, actuate the belt to its extended position. A plurality of the modules can be arranged in an article handling system covering an entire area for the collection, storage and trans-shipment of articles.

Other objects, advantages and features of the invention will become apparent from the following description taken in connection with the accompanying drawings in which.

Figures 2, 3, 4, 5:
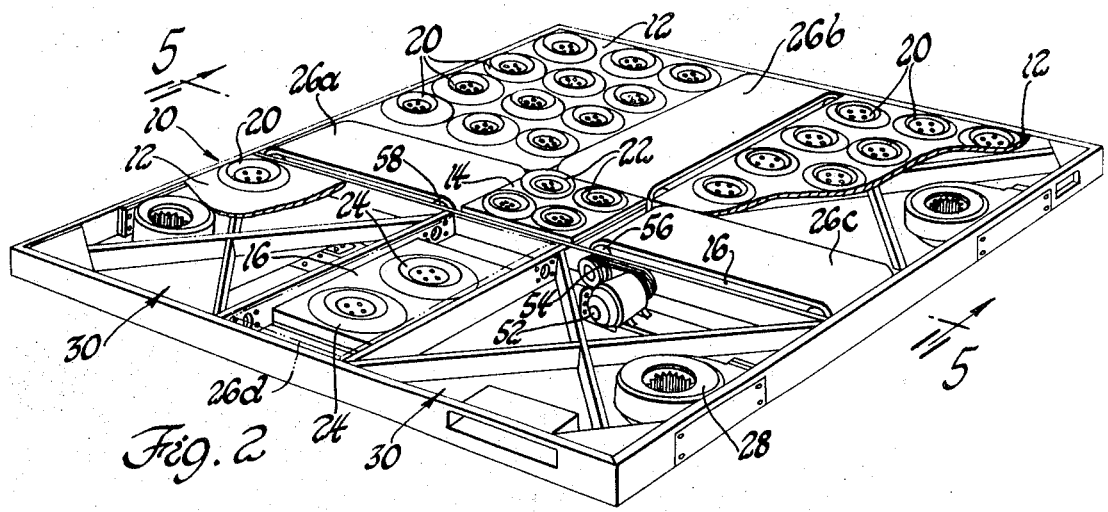
FIG. 2 is a perspective view of an article handling module according to the present invention.
FIG. 3 is a partial perspective view of a portion of the module in FIG. 2 slightly enlarged.
FIG. 4 is a perspective view of an air bearing membrane suitable for use with the present invention.
FIG. 5 is a sectional view taken on lines 5—5 of FIG. 2.

FIG. 2 illustrates an article handling module 10 having a plurality of decks 12, 14 and 16 with means 20, 22, 24 associated with each of the decks energizable to provide a film of air for supporting an article above the surface of the decks. Propulsion means 26 is associated with decks 16 and has extended and retracted positions respectively engageable with and spaced from articles supported on the film of air above the surfaces of the decks. The propulsion means 26 is actuable to an extended position in response to energization of the supporting means 24 associated with the propulsion means 26.

Each of the supporting means comprises a group of air bearings 20, 22 and 24, and each air bearing is operable to provide support for an article when the air bearings are energized with a supply of air. The propulsion means comprises a plurality of propulsion devices in the form of conveyor belts 26 each mounted on a different deck 16 and individually actuable to its extended position in response to energization of its associated group of air bearings 24. As shown, the several propulsion devices are operable to propel an article in different directions so that the direction of movement of the article is determined by extension of a selected propulsion device 26 upon energization of its associated group of air bearings 24 when the article is in position to be engaged by the extended propulsion device.

As pointed out previously, the propulsion devices 26 each comprises a conveyor belt, and each conveyor belt has a portion 27 overlying its associated group of air bearings 24 such that flow of air from the air bearings causes extension of portion 27 of the conveyor belt. In FIG. 5, for example, the phantom lines indicate the extended positions of the upper runs 27 of conveyor belts 26a and 26c. When the air bearings 24 are de-energized and no air flows therefrom, the overlying portions 27 of belts 26 become slack and rest on the inactive air bearings 24 out of engagement with the articles supported above the surface of decks 12 on the film of air provided by air bearings 20.

Deck 14 constitutes the center deck of the module 10, and decks 16 are recessed with respect to the center decks 14. Decks 16 extend outwardly from the center deck 14, and decks 12 constitute main decks between the recessed decks 16, the main decks lying in substantially the same plane as the center deck 14. Thus, an article straddling conveyor belt 26c will be supported on the air bearings 20 of the main decks 12 on each side of conveyor 26c. When the air bearings 24 beneath conveyor belt 26c are energized, the upper portion 27 of conveyor belt 26c will assume the extended position shown in phantom lines in FIG. 5 to engage the bottom surface of the article L. The belt 26c can then be actuated to propel the article L in either direction due to its engagement with the bottom surface of the article. Assuming that the belt is actuated to propel the article toward the left, or toward the center deck 14, the article will come to rest supported on the film of air provided by the air bearings 22 on the center deck 14, in which position it will partially straddle each of the four belts. If the air bearings 24 beneath belt 26b are then energized, belt 26b will be actuated thereby to extend into engagement with the article, and can then be driven to propel the article away from the center deck 14 upon energization of the air bearings 20 located on the main decks 12 on each side of belt 26b. The article will thus be propelled by belt 26b in a direction at a right angle to the direction of belt 26c.

Defined beneath each group of air bearings 20, 22 and 26 are plenum chambers 30, 34 and 32 respectively. Conventional blowers may be employed in each plenum chamber as indicated at 28 in FIG. 2 for energizing the air bearings supported on the deck above the respective plenum chamber. When the plenum chambers are pressurized by the blowers, air from the plenum chambers passes through openings in the decks in registry with the air bearings to energize the air bearings, and in the case of the belt supporting air bearings 24, to extend the belts into position to engage and propel articles.

Obviously, other means can be provided for supplying air to energize the air bearings to individually and selectively energize the respective groups of bearings associated with each deck. Air can be fed to the bearings by manifolds controlled by solenoid valves, or by ducts from a centrally located source of air, the ducts being individually controlled by dampers or solenoid valves so that operation of a valve will energize a selected group of air bearings.

FIGS. 3 and 4 illustrate the typical construction and mounting of the air bearings. Each of the air bearings 20, 22 and 24 comprises an inflatable membrane 36 mounted on the respective decks 12, 14 or 16 (FIG. 4). The membrane 36 has a peripheral flange 38 which is secured by an adhesive or other conventional means to the deck, and a throat portion 40 having apertures 41 formed therein for the escape of air. An annular inflatable portion 42 extends between the peripheral portion and throat portion. The throat portion 40 may be in the form of a disc having apertures 41 formed therein, and normally seats on a raised portion 46 in the center of an annular recessed portion 50 of its respective deck. Openings 44 in the recessed deck portion 50 provide passages for air to flow from the blower or other source to the chamber defined by the interior of the membrane and the deck. Air flows through the openings 44 and air cannot escape from the cavity defined by the membrane except through the openings 41 in the throat portion 40. Hence, the membrane 36 will initially inflate and air will pass from openings 41 into the generally frusto-conical cavity 43 defined by the exterior surface of the throat disc 40 and annular portion 42. Consequently, when the horizontal bottom of an article is disposed over the membrane, the pressurized air flows from cavity 43 over the upper periphery of the annular portion 42 between the upper edge thereof and the opposed bottom surface of the article and provides a film of air supporting the article above the surface of the deck portions in a substantially friction-free manner. When a membrane is damaged, or becomes worn, it can be removed merely by breaking the adhesive bond between the deck and peripheral flange 38 and a new one can be adhesively secured in place. The construction of the particular air bearing may be similar to the construction of the air cushion device shown in U.S. Pat. No. 3,321,038 of Mackie et al.

The conveyors 26 may be driven by a conventional reversible electric motor as indicated at 52 in FIG. 2. As shown in FIG. 2, the motor 52 is connected through a belt 54 with a pulley which in turn is drivingly connected with the drive roll 56 of conveyor 26c. Conveyor 26c may in turn be drivingly connected with conveyor 26a so that motor 52 drives both conveyors 26a and 26c simultaneously. Conveyors 26d (FIG. 1) and 26b may be similarly drivingly connected together. The conveyor illustrated in the drawing is of the endless belt type which extends around the drive rolls 56 and idler rolls 60 and passes beneath the deck 16 through the plenum chamber 32. When the air bearings 24 beneath the conveyor portions 27 are inactive with no air flowing therefrom, portion 27 lies slack over the inactive bearings in spaced relationship to the bottom surface of an article straddling the belt and supported by air bearings 20.

Figure 1:
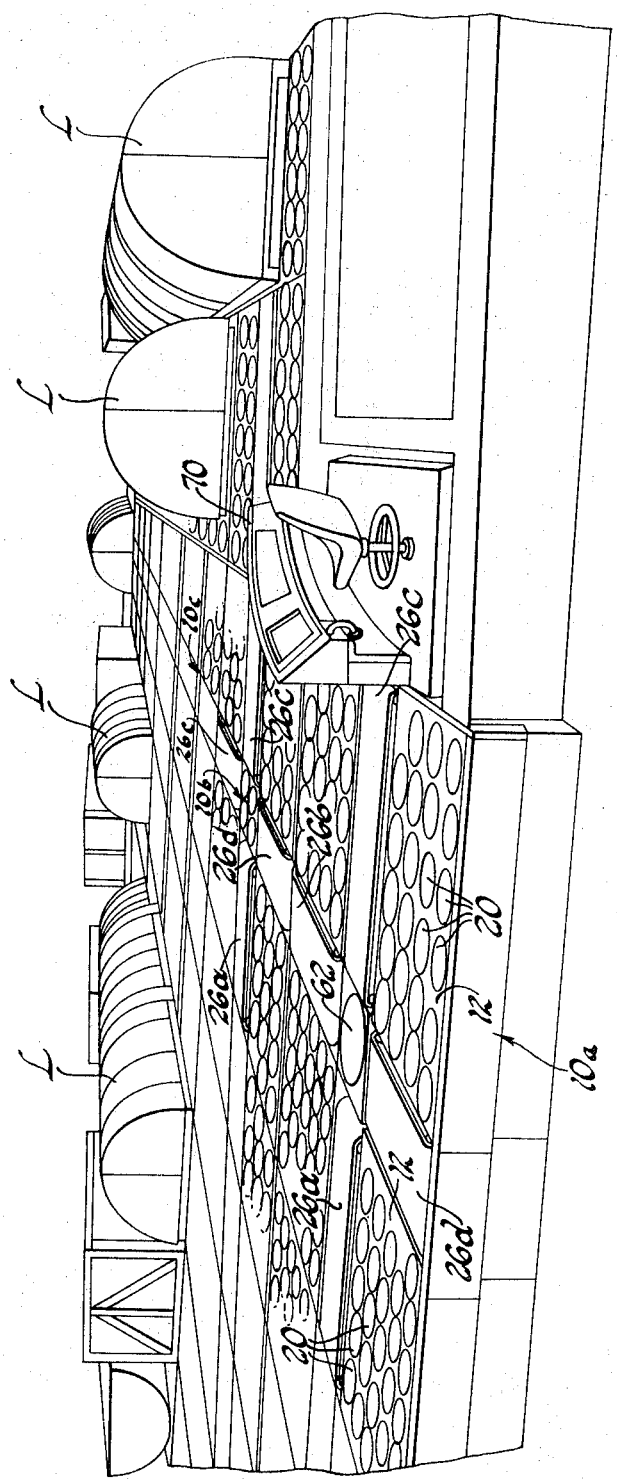
FIG. 1 is a perspective view of a portion of a warehouse having an article handling system according to the present invention.

FIG. 1 illustrates a system for handling articles such as flat bottomed freight containers L or pallets on which containers, vehicles or crates can be carried on air bearings. FIG. 1 thus illustrates an article handling system comprising a storage, collection and transporting area for articles designated by reference character L. A plurality of modules 10a, 10b, 10c, etc. are aligned such that a first or primary path of movement for the articles is defined in the area extending in the direction of conveyors 26d and 26b across the area. Secondary paths are defined in the areas which extend in the direction of conveyors 26a and 26c for connecting the first path with article storage spaces separated from the first path. Decks 12 are located on each side of each path, and the supporting means in the form of air bearings 20 on decks 12 are operable when energized to provide a film of air for friction-free movement of the articles L over the decks 12 and 14 of the module. Conveyors 26b and 26d provide propulsion devices along the primary path, and conveyors 26a and 26c provide propulsion devices along the secondary paths.

The first module 10a in FIG. 1 is provided with a turntable 62 mounted in the center deck 14 for orienting the pallets or articles L as they are received in the system on module 10a. The turntable may comprise a rotatable platform of conventional construction that can be extended and retracted into and out of engagement with the bottom surface of the articles L. Thus, when an article is unloaded onto module 10a straddling conveyor belt 26d, the air bearings 20 on each side of conveyor belt 26d are energized to support the article above the associated decks 12. Energization of the air bearings 24 (FIG. 2) beneath conveyor belt 26d extends the upper portion 27 of the belt into engagement with the bottom surface of the article. The conveyor belt can then be actuated to propel the article to a position overlying deck 14 and the retracted turntable 62. The turntable can then be extended upwardly into engagement with the bottom of the article L and then rotated to orient the article as desired. The article can then be transferred along the primary path to a selected secondary path, and along the selected secondary path to a desired storage area. The articles are transported along the primary path by successively extending belts 26d and 26b of module 10a, belts 26d and 26b of module 10b, and so forth until the intersection between the primary path and the secondary path leading to the desired storage area is reached. At this juncture, the article is then moved to the left or right of the primary path by the belts 26a and 26c.

When the article reaches its destination or storage area, the bearings 20 on the storage module can be de-energized and the article rests on the decks 12 of the storage module and the collapsed air bearing membranes. The article can be relocated as desired, or returned to the primary path by first energizing the bearings 20 beneath the article to provide a support for a moving or stationary article. At this stage, all of the conveyor belts are "dead" on the storage module containing the article, and all of the bearings 20 may be energized. One of the belts is then extended to engage the article by actuating the bearings 24 therebeneath. The extended belt can then be driven in the desired direction to propel the article along the path of the belt.

Movement of the articles can be carried out by an operator from the control console 70 in FIG. 1. The operator can selectively energize any of the groups of air bearings and control the actuation and direction of the various conveyor belts to select the path of movement of the articles. The control console 70 may, for example, have a system map thereon with propulsion control buttons, and a logic network controlling the air supplies and belts on a demand basis ahead of an advancing article or palletized container with interlocks to prevent collisions. Indicator lights may identify the presence and position of an article on a module surface by means of pressure switches located on the module.

While a specific form of the invention has been illustrated and described in the foregoing specification and accompanying drawings, it should be understood that the invention is not limited to the exact construction shown, but that various alterations in the construction and arrangement of parts, all falling within the scope and spirit of the invention, will be apparent to those skilled in the art.

The embodiments of the invention in which an exclusive property or privilege is claimed are defined as follows:

1. Article handling apparatus comprising: a center deck portion; a plurality of main deck portions; a plurality of recessed deck portions each being located between a pair of main deck portions; a plurality of air bearings on each of said main deck portions operable when energized to support an article in a substantially friction free manner above the surface of the respective main deck portions; a powered belt conveyor mounted on each recessed deck portion having an upper portion overlying said recessed deck portion and a lower portion extending beneath said recessed deck portion; at least one air bearing on each recessed deck portion beneath the upper portion of the associated belt conveyor, said upper portion of said associated belt conveyor having a slack position spaced beneath the surface of an article supported by the energized air bearings on said main deck portions, said air bearings on said recessed deck portions each being operable when selectively energized to extend the upper portion of the belt conveyor associated therewith to an extended position to engage an article straddling said belt conveyor and supported by the energized air bearings on said main deck portions and propel the article along the path of said belt conveyor; said center deck portion constituting a neutral zone between said main and recessed deck portions and having orienting means thereon having an active and an inactive condition and operable in the active condition to support an article above the surface of said center deck portion and above the surface of the surrounding main deck portion and permit the article to be rotated about a vertical axis such that an article propelled onto said center deck portion from one direction by one of said belt conveyors can be selectively oriented about a vertical axis upon activation of said orienting means into a position to be propelled from said center deck portion in a desired direction by any one of said belt conveyors whereby an article located on said center deck portion and straddling the recessed deck portions radiating from said center deck portion can be propelled from said center deck portion in a selected direction by selective energization of the air bearings on the recessed deck portions; means for supplying air pressure to said air bearings, and means for activating said orienting means on said center deck portions.

2. Article handling apparatus as claimed in claim 1 wherein said orienting means on said center deck portion comprises a turntable selectively movable in a vertical direction between retracted and extended positions respectively corresponding to the inactive and active conditions and respectively spaced from and engageable with an article supported on the surrounding air bearings on said main deck portions, said turntable being selectively rotatable about a vertical axis.

3. Article handling apparatus as claimed in claim 1 wherein each air bearing comprises an inflatable membrane mounted on the respective deck.

4. Article handling apparatus as claimed in claim 3 wherein said membrane includes a peripheral flange secured to the deck; means defining a central throat portion for the flow of air from the membrane, and an annular inflatable portion between said peripheral portion and throat portion.

5. Article handling apparatus as claimed in claim 4 wherein the means defining a throat portion comprises a disc with a plurality of apertures formed therein.

6. Article handling apparatus as claimed in claim 5 further including at least one opening in the associated deck in registry with the annular inflatable portion of each membrane.

7. Article handling apparatus comprising: a center deck portion; a plurality of main deck portions; a plurality of recessed deck portions being located between a pair of main deck portions; a plurality of air bearings on each of said main deck portions operable when energized to support an article in a substantially friction free manner above the surface of the respective main deck portions; a powered belt conveyor mounted on each recessed deck portion having an upper portion overlying said recessed deck portion and a lower portion extending beneath said recessed deck portion; at least one air bearing on each recessed deck portion beneath the upper portion of the associated belt conveyor, said upper portion of said associated belt conveyor having a slack position spaced beneath the surface of an article supported by the energized air bearings on said main deck portions, said air bearings on said recessed deck portions each being operable when selectively energized to extend the upper portion of the belt conveyor associated therewith to an extended position to engage an article straddling said belt conveyor and supported by the energized air bearings on said main deck portions and propel the article along the path of said belt conveyor.

* * * * *